No. 777,374. PATENTED DEC. 13, 1904.
E. G. HOWARD.
MOTOR DISCONNECTING MECHANISM FOR VALVES.
APPLICATION FILED JAN. 20, 1903.
NO MODEL. 2 SHEETS—SHEET 1.
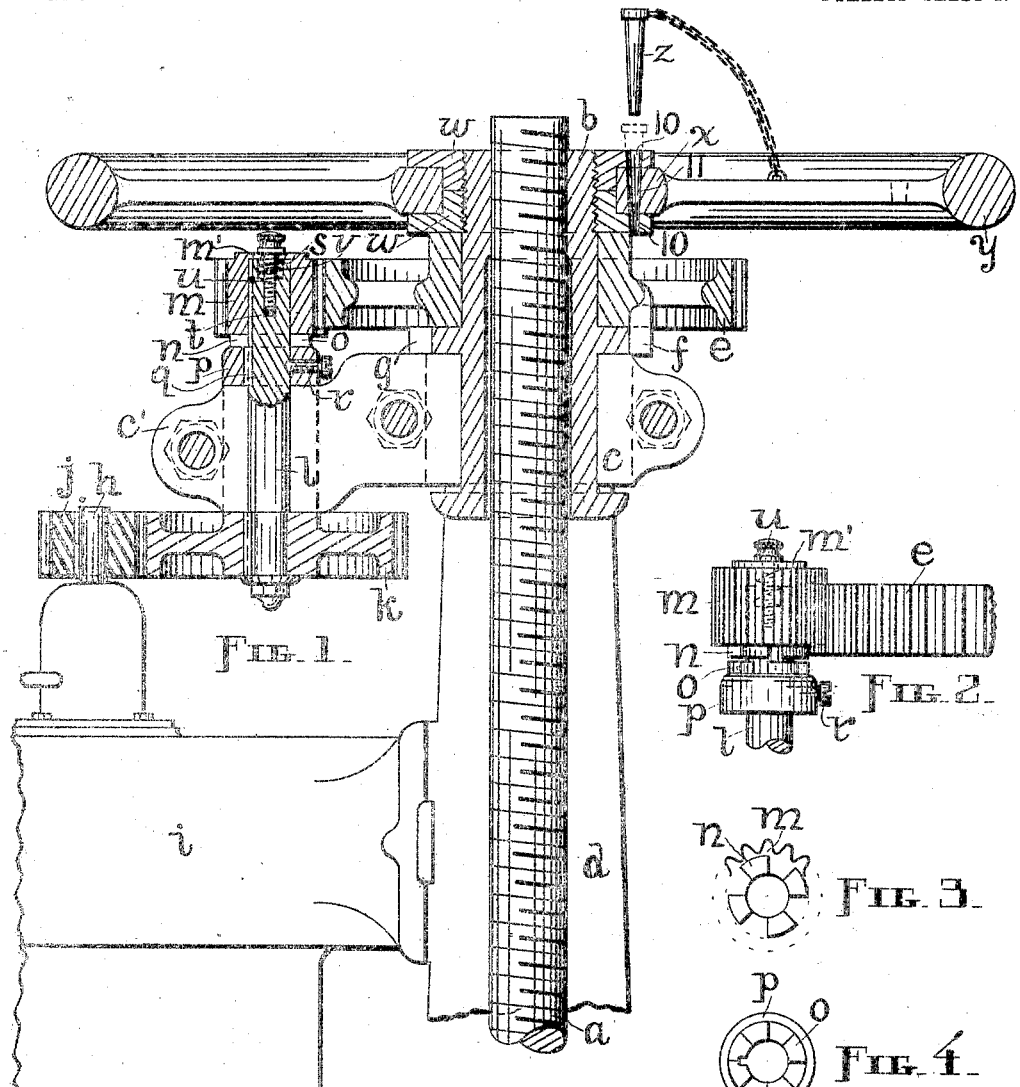
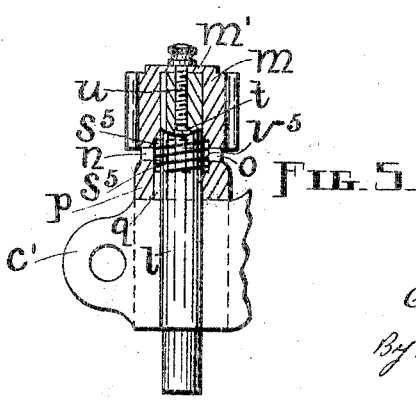
Witnesses
Inventor
Ernest G. Howard
By Webster, Taft & Tilley
Attorneys

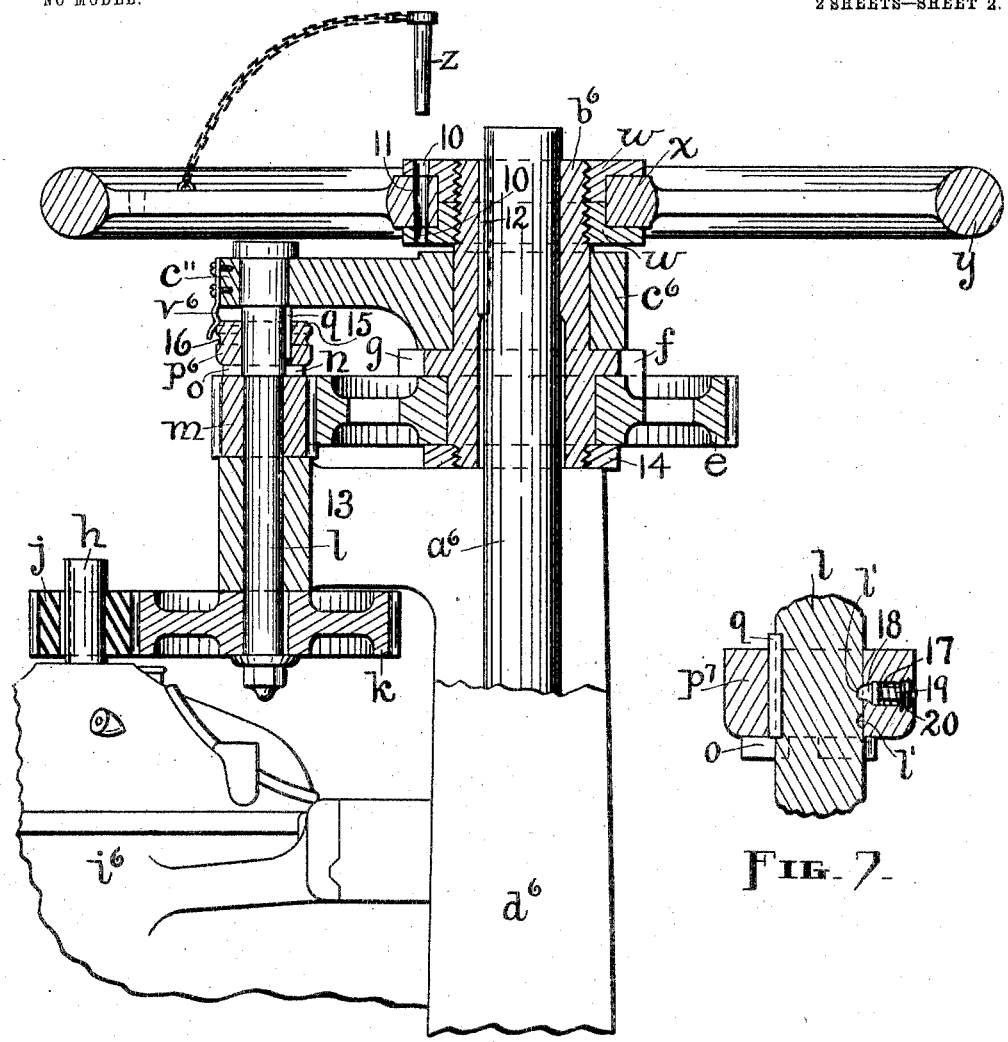

No. 777,374. Patented December 13, 1904.

UNITED STATES PATENT OFFICE.

ERNEST G. HOWARD, OF SPRINGFIELD, MASSACHUSETTS, ASSIGNOR TO CHAPMAN VALVE MANUFACTURING COMPANY, OF SPRINGFIELD, MASSACHUSETTS, A CORPORATION OF MASSACHUSETTS.

MOTOR-DISCONNECTING MECHANISM FOR VALVES.

SPECIFICATION forming part of Letters Patent No. 777,374, dated December 13, 1904.

Application filed January 20, 1903. Serial No. 139,856. (No model.)

*To all whom it may concern:*

Be it known that I, ERNEST G. HOWARD, a citizen of the United States, residing at Springfield, in the county of Hampden and Commonwealth of Massachusetts, have invented new and useful Motor-Disconnecting Mechanism for Valves, of which the following is a specification.

My invention relates to improvements in mechanism employed with motor-driven valves for cutting out the motor, so as to enable the valve to be operated by hand, and incidentally to hand-wheel-connecting means in which a clutch introduced into the driving mechanism forms the essential feature, subsidiary to which is a loose hand-wheel member and means to lock the same to the spindle or its accessories.

With valves for controlling water, steam, &c., which are operated under ordinary circumstances by means of a motor generally attached directly to the casing or housing, it is customary to provide a hand-wheel to serve as a medium for manually actuating the gate or plug when for any reason the motor is out of service; and the primary object of my improvement is to provide means for quickly and easily disconnecting the motor, so that the manual operation can be performed without hindrance or opposition on the part of said motor. Conversely, by the same means the motor can be as readily brought into active conjunction with the gate-actuating members.

A further object of my invention is to afford suitable means for utilizing a member in the double capacity of balance-wheel and hand-wheel, such member serving as a balance-wheel when the mechanism is driven by the motor.

A practical and efficient embodiment of mechanism possessing the desired advantages and by which I attain the above-noted objects is illustrated in the accompanying drawings, in which—

Figure 1 is a sectional view of the upper part of valve, showing one form of my invention, so much of the motor as is shown being in elevation; Fig. 2, a detail view of the clutch in elevation disconnected; Fig. 3, a bottom view of the clutch-pinion; Fig. 4, a top view of the clutch-collar; Fig. 5, a sectional view of a modified form of clutch; Fig. 6, a sectional view of the upper part of a valve and a side view of a part of a motor attached thereto, showing another modified form of clutch; and Fig. 7, a sectional view, on an enlarged scale, of still another modified form.

Similar letters and figures refer to similar parts throughout the several views.

Although only the upper part of the valve-spindle and a portion of that part of the casing or housing known as the "yoke" are shown in Figs. 1 and 6, it will be understood that such spindle has a valve gate or plug at its lower end, while the yoke is supported upon a cap, all in the usual and well-known manner.

My invention is applicable to numerous and various styles of valves and motors without material change.

In Fig. 1 what is known as an "outside" screw-spindle is illustrated, while in Fig. 6 the other form, known as the "inside" screw-spindle, appears. A lost-motion device is introduced into the mechanism shown in these two figures; but this is an unimportant feature as far as the present invention is concerned, and the same would be applicable to mechanism in which no lost-motion device was present.

In general the invention may be said to consist of a clutch located between the motor and valve-spindle and so constructed and arranged as to permit the driving mechanism to be readily disconnected or connected at will. The object of disconnecting the motor is to enable the valve-spindle to be independently operated by the hand-wheel. Hence it becomes necessary to provide suitable means for connecting or disconnecting the hand-wheel to the spindle, such hand-wheel under ordinary circumstances being permitted to run freely, owing to the fact that if permanently locked to the spindle-operating mechanism the momentum of the same would be so great as to seriously interfere with the successful operation of the valve by means of the motor.

Proceeding now to a consideration of the features shown in the first four figures, it appears that the valve-spindle $a$ has its upper threaded terminal in engagement with an internally-threaded sleeve $b$, which is journaled in the yoke-head $c$ of the yoke $d$, suitable external flanges on said sleeve serving to retain it in position. A gear $e$ is loosely mounted on the sleeve $b$ and provided with a clutch projection $f$, and a clutch projection $g$ on said sleeve extends into the path of said projection $f$, so that after said gear has described a part of a revolution its clutch projection encounters the clutch projection $g$ and rotates the sleeve, which in turn acts upon the spindle $a$ to raise or lower the same, according to the direction in which the gear is revolved. The object of mounting the gear $e$ loosely on the sleeve and providing the clutch projections is to enable the motor to gather sufficient momentum to overcome the resistance offered by the spindle and gate when at the extreme limits of their travel.

The shaft $h$ of the motor $i$, which is securely attached to the yoke $d$, has a pinion $j$ fast thereon and in mesh with a gear $k$, fast to an intermediate shaft $l$, journaled in a yoke-head projection $c'$. A pinion $m$, loose on the upper end of the shaft $l$, meshes with the gear $e$ and is provided on its under surface with clutch projections $n$, which are adapted to engage or release clutch projections $o$ on the top of a collar $p$, held to the shaft $l$ by means of a spline $q$ or in any other suitable manner. A set-screw $r$, threaded through an opening in the side of the collar $p$ and adapted to enter a depression in the shaft $l$, may be employed, if necessary, to prevent axial movement of said collar. The upper end of the shaft $l$ is bored out to form a chamber $s$, from the bottom of which a threaded passage $t$ extends downwardly. A plate $m'$, integral with or rigidly attached to the top of the pinion $m$, covers the top of the shaft, and a screw $u$ passes through the center of said plate into threaded engagement with the sides of the shaft-passage $t$. A spring $v$ is inserted in the chamber $s$ and bears between the floor of said chamber and the under surface of the plate $m'$.

The upper end of the sleeve $b$ is externally screw-threaded to receive the flanged nuts $w$ $w$. The hub $x$ of the hand-wheel $y$ is received into the groove formed by the flanges of the nuts $w$ and is adapted to revolve freely therein. The flange of each nut $w$ is provided with a hole 10, and a hole 11 is so arranged in the hub $x$ that it may be brought into juxtaposition with the holes 10, so as to enable said hub to be locked to said nuts by means of a pin $z$, which can be introduced into said holes. This pin is shown poised ready for use in Fig. 1. By preference the pin and holes are tapered in order to insure a tighter fit when the former is inserted in the latter.

When the parts stand as shown in Fig. 1, power is communicated from the motor $i$ to the spindle $a$ through the medium of the pinion $j$, gear $k$, shaft $l$, collar $p$, clutch projections $o$ and $n$, pinion $m$, gear $e$, clutch projections $f$ and $g$, and sleeve $b$, the hand-wheel $y$ meanwhile running freely and serving as a balance-wheel. It may be said in this connection that at the beginning and end of the motion imparted to the spindle by the motor, or, to be more exact, to the sleeve $b$, the hand-wheel will not revolve as fast as said sleeve and the attached nuts $w$ in the first instance and will revolve faster in the last and even continue its motion for a limited time after the movement of the other parts ceases; but during a considerable portion of the time that intervenes between such beginning and ending said hand-wheel travels at the same rate of speed as its journal.

In case the motor breaks down or for any other reason it becomes desirable or necessary to operate the valve by hand the screw $u$ is turned up sufficiently to allow the pinion $m$ to be raised by the spring $v$ until its projections $n$ clear the collar projections $o$, and the hand-wheel $y$ is locked to the sleeve $b$ by dropping the pin $z$ into place, as indicated by dotted lines in Fig. 1, after turning said hand-wheel until the holes 10 and 11 are in position to enable this to be done. Now by rotating the hand-wheel $y$ motion is imparted to the spindle through the medium of the sleeve $b$ without being obliged to actuate other parts of the motor-driven mechanism, except the gear $e$ and pinion $m$, as soon as the lost motion is taken up, said pinion then turning freely on the shaft $l$. The clutch now stands as shown in Fig. 2.

To restore the valve to the control of the motor, turn down the screw $u$ until the clutch projections $n$ and $o$ are again in engagement and remove the pin $z$ to free the hand-wheel.

The modified form of clutch shown in Fig. 5 differs from the clutch above described only in that the chamber $s$ is omitted from the top of the shaft $l$ and recesses $s^5$ $s^5$ are formed in the base of the pinion $m$ and the top of the collar $p$ to receive a spring $v^5$, which in this case encircles said shaft instead of being inclosed therein and encircling the screw $u$. With this construction no set-screw $r$ is required. When the screw $u$ is turned up, the spring $v^5$ raises the pinion, with its clutch projections, clear of the collar clutch projections, as in the other case.

In Fig. 6 the inside screw-spindle $a^6$ and sleeve $b^6$ are attached one to the other by means of a spline 12, said sleeve being supported in the yoke-head $c^6$ of the yoke $d^6$ and held against longitudinal movement by a flange or collar bearing against the under side of the yoke-head $c^6$, which precludes upward movement, and by the lower nut $w$, which precludes downward movement, of the sleeve. The shaft or spindle $l$ is supported and turns in a bracket or arm $c''$, projecting from the yoke-head $c^6$, and in a bracket 13 in the form of a bow or arch extending outward from and connecting the two uprights of the yoke $d^6$. A nut 14 retains the gear $e$ in place upon the sleeve $b^6$. The gear $e$ is rotatably loose on the sleeve $b^6$ between the aforesaid flange and ring. Clutch projections $f$ and $g$ on the gear and sleeve, respectively, are used for the same purpose as like members in Fig. 1. The shaft $h$ of the motor $i^6$ has a pinion $j$ fast thereon and in mesh with a gear $k$, fast to the intermediate shaft $l$. The shaft $l$ is journaled in yoke-brackets $c''$ and 13. A pinion $m$, loose on the shaft $l$ above the bracket 13, meshes with the gear $e$ and is provided on its upper surface with clutch projections $n$. Clutch projections $o$ on a collar $p^6$ are adapted to engage or disengage the clutch projections $n$ when said collar is moved axially. The collar $p^6$ is keyed at $q$ to the shaft $l$ above the pinion $m$ and is provided with a circumferential bevel 15 and a peripheral groove 16. A spring $v^6$ has one terminal fastened to the end of the bracket $c''$ and its free terminal extended downward to bear upon the bevel 15 or enter the groove 16.

When the collar $p^6$ is in its lower position, as shown in Fig. 6, the locking-terminal of the spring $v^6$ engages the bevel 15 and prevents upward displacement of said collar, and the spindle $a^6$ is revolved by the motor when the latter is set in motion through the medium of the driving parts above described; but when the collar $p^6$ is elevated so as to disengage the clutch projections on said collar from those on the pinion $m$ the motor is disconnected, the locking-terminal of the spring $v^6$ then engaging the groove 16 to hold said collar in its elevated position.

The sleeve $b^6$ is provided with nuts $w$ $w$, as is the sleeve $b$, which serve as a journal for a hand-wheel $y$ in the same manner as has already been described. A pin $z$ for locking the hand-wheel hub $x$ to the nuts $w$ $w$ is shown poised above the holes 10 and 11 in Fig. 6.

It will be readily understood that the operation of the Fig. 6 mechanism is substantially like that of the Fig. 1 mechanism.

In place of the collar $p^6$ on the intermediate shaft and the spring $v^6$ to hold said collar in position I may, as shown in Fig. 7, employ a collar $p^7$, having a horizontal chamber 17, in which a bolt 18 is located, said bolt being arranged so that its nose engages an indentation $l'$ in the intermediate shaft $l$, there being two of such indentations provided. A spring 19 is interposed in the chamber 17, between the enlarged front end of the bolt 18 and a nut 20, threaded to the sides of said chamber near the outer end thereof. A spline or key $q$ rotatably connects the collar $p^7$ with the shaft $l$. Clutch projections $o$ are provided on the bottom of the collar to engage corresponding projections on a pinion below in the same manner as is fully illustrated in Fig. 6.

When the bolt 18 engages the lower indentation $l'$, the adjacent pinion is locked to the shaft $l$ by means of the collar $p^7$, and the connection between motor and spindle is complete. To break this connection, unscrew the nut 20 with a suitable spanner-wrench and withdraw the bolt 18 from engagement with the shaft, then raise the collar $p^7$ until said bolt can be thrust into the upper indentation $l'$ and reseat the nut 20. The clutch projections $o$ are now out engagement with the pinion clutch projections, and the motor is disconnected.

I do not wish to be confined to the exact construction and arrangement of parts herein shown and described, as many and varied departures may be made in both motor and valve construction and in the location and arrangement of the clutch without departing from the nature of my invention. For example, if beveled gears are substituted for spur-gears either form of the clutch shown may be used, provided it is placed in a horizontal position, if required, as would generally be the case under such circumstances. Then again the valve construction may be such as to require that the clutch be inverted. It has not been deemed necessary to encumber the case with these and other well-known modified forms of valve construction having my invention incorporated therewith, for the reasons that such modifications are not only numerous, but because one skilled in the art can readily apply or adapt said invention to any of the various forms. I am aware, too, that some other means besides a pin may be used to lock the hand-wheel to the spindle or its sleeve; but this method is quite as practicable for the purpose as any other.

Means for separating the clutch members either by axially moving the pinion or the collar are shown, and it is clear that a gear or other toothed wheel may be substituted for the pinion as a part of the clutch in any event.

As before intimated, I do not wish to be confined to any particular kind of gearing, sprocket-wheels and chains even being practicable in some cases.

In another application, filed in my name March 31, 1902, Serial No. 100,699, I have described and claimed the combination, with a reciprocating valve-spindle and a motor, of driving mechanism between said motor and spindle, comprising a gear mounted to revolve freely in either direction about the spindle and provided with a clutch projection and a spindle-operating member mounted to revolve freely in either direction about the spindle and provided with a clutch projection, the clutch projections being each normally in the path of travel of the other and capable of limited independent movement, also a like combination with a hand-operated member by which to turn the spindle in either direction without the aid of the motor, also a reciprocating spindle-nut carrying one of the clutch projections, combined with means to limit the movement of said nut in the direction of the axis of the spindle, and in application Serial No. 123,955, filed September 18, 1902, I have set forth and claimed the combination, with a valve-gate and a motor, of a spindle adapted to actuate the gate, a lost-motion device in said mechanism, a hand-wheel capable of serving as a balance-wheel or as a means for manually operating the spindle, and means to so adjust the lost-motion device as to disconnect the motor and leave the spindle to the control of the hand-wheel, also a specific means for effecting and maintaining such disconnection. I do not, therefore, specifically claim in this application those precise combinations.

The leading feature of the present application is a frictional or slipping connection between the hand-wheel and the spindle-actuating sleeve whereby the motor is enabled to start and stop without undue or material hindrance from said wheel, yet is steadied and aided by said wheel when the latter is fully speeded.

The present application is intended to set forth and claim somewhat more specifically matters which are disclosed and claimed in a broader or more generic way in earlier applications filed in my name. These said applications are Serial No. 100,699, filed March 31, 1902, and Serial No. 107,457, filed May 15, 1902.

What I claim as my invention, and desire to secure by Letters Patent, is—

1. In combination with a valve-housing, valve, and valve-actuating spindle, a motor; connecting mechanism interposed between the motor and the spindle; a clutch introduced into said connecting mechanism to establish and destroy at will the driving connection; a hand-wheel, frictionally connected with the spindle; and means for locking the hand-wheel to the spindle.

2. In combination with a valve-housing, valve, and valve-actuating spindle, a motor; connecting mechanism interposed between the motor and the spindle; a clutch introduced into said connecting mechanism and comprising two interlocking members, one loose and the other slidable upon but splined to a carrying-shaft; a hand-wheel frictionally connected with the valve-actuating spindle; and means for locking the hand-wheel to the spindle.

3. A motor, a valve-spindle, driving mechanism between the two, a clutch introduced into said mechanism and adapted to disconnect or connect the motor, a hand-wheel arranged to run loose with the spindle, and means to lock said hand-wheel to the spindle.

4. In combination with a valve-housing, valve, and valve-actuating spindle; a motor and intermediate gear for moving said spindle; and a wheel frictionally connected with a moving part or member driven by the motor, substantially as and for the purpose described.

5. In combination with a valve-housing, valve, and valve-actuating spindle, a motor, intermediate connecting gear or mechanism, and a wheel, frictionally connected with a rotatable member of said train; whereby it is adapted to come gradually into and go gradually out of rotation without interfering with the sudden starting and stopping of the motor.

6. In combination with a valve-housing, valve, and valve-actuating spindle, a motor for rotating said spindle, an intermediate train or gear connecting the motor and the spindle, and a wheel frictionally connected with the train or connecting-gear; whereby it is adapted to come gradually up to the speed of the part by which it is carried, and to continue in motion after such carrying part comes to rest.

7. In combination with a valve housing or casing, valve, and valve-actuating spindle, a sleeve encircling said spindle; a motor; gear connecting said sleeve and motor; and a wheel carried by and frictionally connected with said sleeve, the sleeve and wheel being capable of independent rotation when the motor is operatively connected with the sleeve.

8. The combination with a valve-housing and a motor associated therewith, of a gate; a rotary spindle adapted to actuate said gate; a gear loose on said spindle, having a clutch projection; a member rotatably connected with the spindle and provided with a clutch projection normally extending into the path of the first-mentioned projection; a driving mechanism between said gear and motor, the motor and gate-operating mechanism being adapted to actuate the gate from and into either one of its extreme positions; and a wheel serving as a friction-operated balance-wheel when not locked to the spindle.

9. The combination with a valve-housing and a motor associated therewith, of a gate; a non-reciprocating rotary spindle adapted to actuate said gate; a gear loose on said spindle, having a clutch projection; a member rotatably connected with the spindle and provided with a clutch projection normally extending into the path of the first-mentioned projection; a driving mechanism between said gear and motor, the motor and gate-operating mechanism being adapted to actuate the gate from and into either of its extreme positions; and a wheel serving as a frictionally-operated balance-wheel when not locked to the spindle.

10. The combination in motor-driven valve mechanism, of an intermediate shaft, a collar revolubly connected therewith and provided with clutch projections, a toothed wheel loose on said shaft and provided with clutch projections adapted to engage or disengage the collar projections, a screw threaded to the shaft and bearing on said toothed wheel, and a spring arranged to cause the pinion to follow the screw when turned out of the shaft.

11. The combination in motor-driven valve mechanism, of an intermediate shaft, a collar revolubly connected therewith and provided with clutch projections, an axially-movable toothed wheel loose on said shaft and provided with clutch projections adapted to engage or disengage the collar projections, a screw threaded to the shaft and bearing on said toothed wheel, and a spring interposed between the toothed wheel and a non-reciprocating part.

12. The combination of a motor, a valve-spindle, a sleeve adapted to operate said spindle, driving mechanism between said motor and sleeve, a clutch introduced into said mechanism and adapted to connect or disconnect the motor, a journal on the sleeve, a hand-wheel loosely mounted on said journal, and means to lock the hand-wheel to the journal.

13. The combination of a motor, a valve-spindle, a sleeve adapted to operate said spindle, driving mechanism between said motor and sleeve, a clutch introduced into said mechanism and adapted to connect or disconnect the motor, flanged members on the sleeve, a hand-wheel having its hub loosely held between the flanges of said members, and a pin arranged to lock said hub to the members by connecting pin-receiving parts.

In testimony whereof I have signed my name to this specification in the presence of two subscribing witnesses.

ERNEST G. HOWARD.

Witnesses:
    STEPHEN S. TAFT, Jr.,
    F. A. CUTTER.